(12) United States Patent
Buchmayer et al.

(10) Patent No.: US 8,509,778 B2
(45) Date of Patent: Aug. 13, 2013

(54) HANDLING LOCATION INFORMATION FOR FEMTO CELLS

(75) Inventors: Mats Buchmayer, Stockholm (SE); Jari Vikberg, Järna (SE); Tomas Nylander, Värmdö (SE); Tomas Hedberg, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 562 days.

(21) Appl. No.: 12/740,089

(22) PCT Filed: May 28, 2008

(86) PCT No.: PCT/SE2008/050624
§ 371 (c)(1),
(2), (4) Date: Apr. 28, 2010

(87) PCT Pub. No.: WO2009/058068
PCT Pub. Date: May 7, 2009

(65) Prior Publication Data
US 2010/0240397 A1    Sep. 23, 2010

Related U.S. Application Data

(60) Provisional application No. 60/983,293, filed on Oct. 29, 2007.

(51) Int. Cl.
*H04W 36/00* (2009.01)
(52) U.S. Cl.
USPC .......... 455/436; 455/458; 455/439; 370/331; 370/254; 370/401

(58) Field of Classification Search
USPC .......... 455/127.1, 127.4, 127.5, 343.1, 343.2, 455/343.4, 434, 435.1–435.3, 436–444, 456.1–457, 515, 522, 524, 525, 550.1, 552.1, 455/574, 5.1–435.3; 370/310, 318, 320, 370/328, 331, 332, 335
See application file for complete search history.

(56) References Cited

U.S. PATENT DOCUMENTS

| | | | |
|---|---|---|---|
| 8,089,400 B1 * | 1/2012 | Fang et al. | 342/357.42 |
| 2002/0077115 A1 * | 6/2002 | Ruutu et al. | 455/456 |
| 2003/0040323 A1 * | 2/2003 | Pihl et al. | 455/456 |
| 2003/0125046 A1 * | 7/2003 | Riley et al. | 455/456 |
| 2004/0180670 A1 * | 9/2004 | Pande et al. | 455/456.1 |
| 2006/0203762 A1 * | 9/2006 | Taubenheim et al. | 370/328 |
| 2006/0270349 A1 * | 11/2006 | Overy et al. | 455/41.2 |
| 2007/0105527 A1 * | 5/2007 | Nylander et al. | 455/403 |
| 2007/0238448 A1 * | 10/2007 | Gallagher et al. | 455/414.2 |
| 2008/0188243 A1 * | 8/2008 | Giustina et al. | 455/456.6 |
| 2008/0220795 A1 * | 9/2008 | Bose et al. | 455/456.5 |
| 2008/0293419 A1 * | 11/2008 | Somasundaram et al. | 455/437 |
| 2008/0318596 A1 * | 12/2008 | Tenny | 455/456.2 |

(Continued)

*Primary Examiner* — Mehendra Patel

(57) ABSTRACT

The present invention relates to methods and arrangements for configuring the HeNB (Home eNode B) to retrieve location information indicative of its location and sending this location information via a core network node to a UE (User Equipment) authorized to access the HeNB. The UE can then based on this received location information and on a determination of the location of the UE determine whether the UE is being positioned in the coverage of the HeNB. This implies that the authorized UEs of the HeNB know when they should try to find and access the HeNB and the UEs may then avoid accessing the HeNB when it is out of the HeNB coverage which will save UE battery and reduce interference.

22 Claims, 3 Drawing Sheets

(56) References Cited

U.S. PATENT DOCUMENTS

2009/0061924 A1* 3/2009 Morrill et al. ............... 455/552.1
2009/0098873 A1* 4/2009 Gogic ........................... 455/436
2009/0098885 A1* 4/2009 Gogic et al. ................ 455/456.1
2009/0104905 A1* 4/2009 DiGirolamo et al. ......... 455/434

* cited by examiner

HANDLING LOCATION INFORMATION FOR FEMTO CELLS

This application claims the benefit of U.S. Provisional Application No. 60/983,293, filed Oct. 29, 2007, the disclosure of which is fully incorporated herein by reference.

TECHNICAL FIELD

The present invention relates to methods and arrangements in a mobile telecommunication network and in particular to handling of location information for femto cells.

BACKGROUND

The Universal Mobile Telecommunication System (UMTS) Terrestrial Radio Access Network (UTRAN) is a radio network of a UMTS system which is one of the third-generation (3G) mobile communication technologies, which was designed to succeed GSM.

Evolved UMTS Terrestrial Radio Access Network (E-UTRAN, also referred to as LTE (Long Term Evolution)) is standardized by 3GPP Long Term Evolution (LTE) which is a project within the $3^{rd}$ Generation Partnership Project (3GPP) to improve the Universal Mobile Telecommunication System (UMTS) standard with High Speed Packet Access functionality to cope with future requirements in terms of improved services such as higher data rates, improved efficiency, lowered costs etc. An E-UTRAN typically comprises user equipments (UE) 202 wirelessly connected to radio base stations 204a-c as illustrated in FIG. 1. In the E-UTRAN, the radio base stations 204a-c are directly connected to the core network (CN) 203 e.g. to a MME (Mobility Management Entity). In addition, the radio base stations 204a-c are also connected to each other via an interface. The radio base stations are usually referred to as NodeB in UTRAN and to eNodeB in E-UTRAN. Furthermore, a home radio base station 201 denoted Home eNode B (HeNB) may be connected to the core network, either directly to MME/SGW (Serving Gateway) or indirectly via a gateway node. A HeNB is a radio base station having a reduced coverage adapted to be used in a home environment, implying a reduced power consumption.

The LTE concept also includes the possibility to have an E-UTRAN radio base station serving at least one LTE femto cell to provide home or small area coverage for a limited number of users, e.g. a family. This type of radio base station is referred to as Home eNodeB (HeNB) in this specification.

The HeNB would provide normal coverage for the end users and would be connected to the mobile core network and/or Gateway using some kind of IP based transmission. The coverage provided is called femto cell in this document.

One of the main drivers of this concept of providing Local Access is to provide cheaper call and/or transaction rates/charges when connected via the HeNB compared to when connected via the eNBs of the macro radio network. Another driver is improved capacity for a user since the HeNB may provide dedicated service to one user or to a very limited number of users.

The HeNB is usually connected to the mobile core network and possibly to other HeNB or eNB via the end user's existing broadband connection (e.g. xDSL, Cable).

In order to achieve access control to the HeNB, the concept of HeNB White-list has been introduced. The HeNB Whitelist comprises Closed Subscriber Groups, CSG ids (e.g. cell identity) of the HeNBs which the UE is authorized to access. The UE reads the broadcasted system information in a cell and can identify that the cell is a femto cell. The UE can then read a global cell identity such as the unique "Long Cell Identity" (which comprises for example PLMN-id, Tracking Area Id and Cell Id or only PLMN-id and Cell Id or only the Cell Id) of the femto cell, to further check towards to contents of the HeNB White-list to find out whether the UE is allowed to access that specific femto cell. This means that the HeNB White-list for a specific UE should comprise a number of "Long Cell Identities" for the femto cells that this UE is authorized to access. The main advantage is that the UEs can avoid performing unnecessary access attempts to HeNBs that the UE is unauthorized to access. The list may be transferred to the UEs by dedicated signaling or e.g. initially configured during a pairing procedure.

It has also been discussed in 3GPP that the MME of the core network should be able to reject e.g. a Tracking Area Update or a Service Request from an UE accessing via a HeNB that the UE is not allowed to use. This means that the MME has access to an Access Control Database which contains information about the UEs that are authorized to access a specific HeNB (e.g. identified by an HeNB-id). The UEs may be identified with e.g. the IMSI (International Mobile Subscriber Identity).

SUMMARY

The object of the present invention is to achieve a solution for informing a user equipment on the availability of accessible femto cells controlled by Home eNodeBs, referred to as femto cell location information, and how to keep the femto cell Location Information updated in the user equipments.

This is achieved by configuring the HeNB to retrieving location information of its location and sending this location information to a UE allowed to access the HeNB. The UE can then based on this location information determine whether the UE is being positioned in the coverage of the HeNB. This implies that the authorized UEs of the HeNB know when they should try to access the HeNB and the UEs may then avoid accessing the HeNB when it is out of the HeNB coverage which will save UE battery consumption and reduce interference.

According to a first aspect of the present invention, a method for a Home eNode B (HeNB) of a mobile telecommunication network is provided. The HeNB is connectable to a core network of the mobile telecommunication network and is adapted to serve at least one femto cell. The HeNB is further connectable to a set of UEs being authorized to connect to the HeNB. In the method, femto cell location information indicative of a location of the HeNB is retrieved and the retrieved femto cell location information is sent to the core network node. The core network node forwards the retrieved femto cell location information to a UE authorized to connect to said HeNB, such that the UE can determine whether the UE is within or close to the coverage of the HeNB. Accordingly, a HeNB implementing the method is also provided. The HeNB comprises means for retrieving femto cell location information indicative of a location of the HeNB, a transmitter for sending the retrieved femto cell location information to the core network node. The core network node forwards the retrieved femto cell location information to a UE authorized to connect to said HeNB, such that the UE can determine whether the UE is within or close to the coverage of the HeNB.

According to a second aspect of the present invention, a method for a UE authorized to be connected to a Home eNode B (HeNB) of a mobile telecommunication is provided. The HeNB serves at least one femto cell. The method comprises the steps of receiving femto cell location information indicative of a location of the HeNB, determining (215) its own location. Based on the location information and the UE location it is determined whether the UE's own location is within a range in relation to the location of the HeNB. If it is determined that the location of the UE is within a range in relation to the location of the HeNB, the UE searches for the HeNB and attempts to access the HeNB. Furthermore, the present invention also concerns a UE. The UE comprises means for receiving femto cell location information indicative of a location of the HeNB, means for determining its own location. In addition means for determining whether its own location is within a range in relation to the location of the HeNB based in the received information and based on the UE location information is provided. The UE also comprises means for searching for the HeNB and for performing an access attempt to the HeNB.

According to a third aspect of the present invention a method for a core network node connectable to a Home eNode B (HeNB) and to at least one UE via a radio base station is provided. The UE is authorized to access the HeNB and the method comprises the steps of receiving femto cell location information indicative of a location of the HeNB, forwarding the received femto cell location information to the at least one UE via the radio base station such that the UE can determine whether the UE is within the coverage of the HeNB. Hence, a core network node connectable to the HeNB is also provided. The core network comprises means for receiving femto cell location information indicative of a location of the HeNB, and means for forwarding the received femto cell location information to the at least one UE via the radio base station. The UE can then determine whether the UE is within the coverage of the HeNB. In addition, the core network also comprises means for forwarding information between the HeNB and the UE to be used for determining whether the HeNB should be switched on/off.

An advantage with having the HeNB performing the detection of the "Femto Cell Location Information" is that it allows the HeNB and consequently also the terminals to always be updated with the surrounding configuration of the HeNB.

DETAILED DESCRIPTION

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details. Moreover, the present invention and the embodiments thereof will be exemplified by an LTE network where eNBs and HeNBs are involved. It should however be understood that the present invention is not restricted to LTE, HeNBs and eNBs, since the invention may also be applied in any mobile telecommunication network having radio base station providing femto cell coverage, which are referred to as HeNBs in this specification.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

As stated above, it is desired to achieve a solution for informing a user equipment on the availability of accessible Home eNodeBs (HeNBs) that the user equipment is authorized to access. If the UE obtains knowledge of the available HeNBs that the UE is authorized to access, the UE can avoid trying to find the HeNBs or performing access attempts when the UE is out of coverage of such HeNBs.

It should be noted that a UE is authorized to access a HeNB if the (U)SIM-card of the UE is configured with authorization to access the HeNB. E.g., the members of a family may have subscriptions allowing each of the members to access a HeNB which may be placed in the home of the family and the family may also bring this HeNB to another location.

The information of the availability of accessible HeNBs is referred to as Femto Cell Location Information since the HeNB serves a cell denoted femto cell. The Femto Cell Location Information is indicative of the location of the HeNB, which implies that if the UE is aware of the location of the HeNB, the UE can determine when it is in the coverage of a HeNB or close to the HeNB and then the UE can perform access attempts accordingly.

Figure 1:
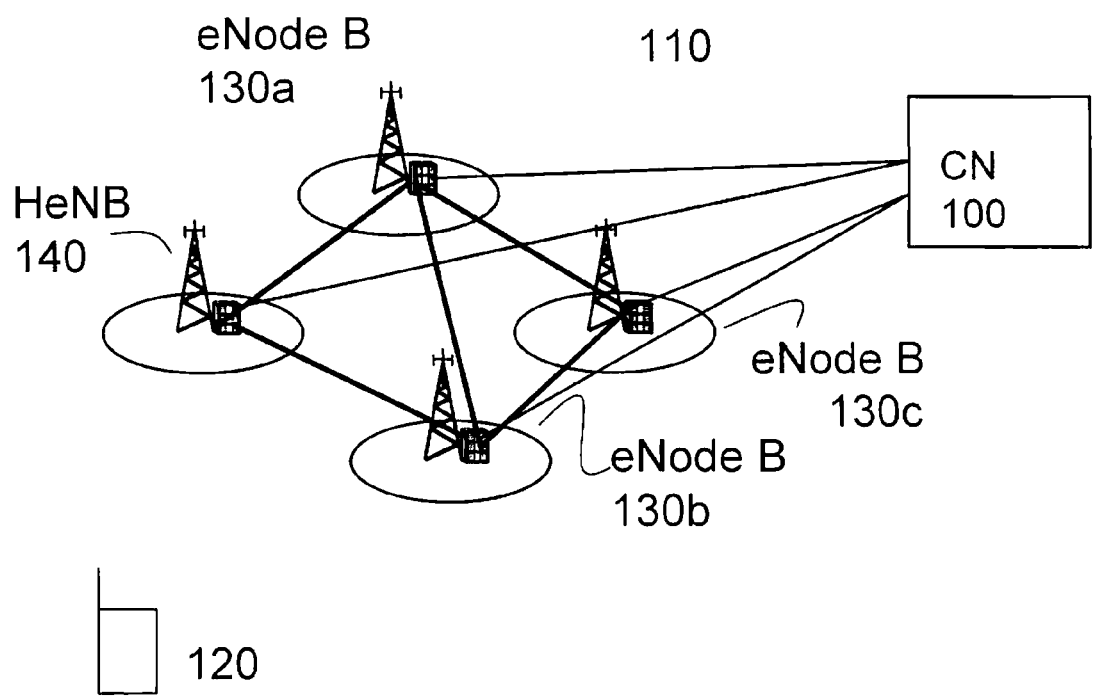
FIG. 1 illustrates schematically a mobile telecommunication network wherein the present may be implemented.
Figure 2:
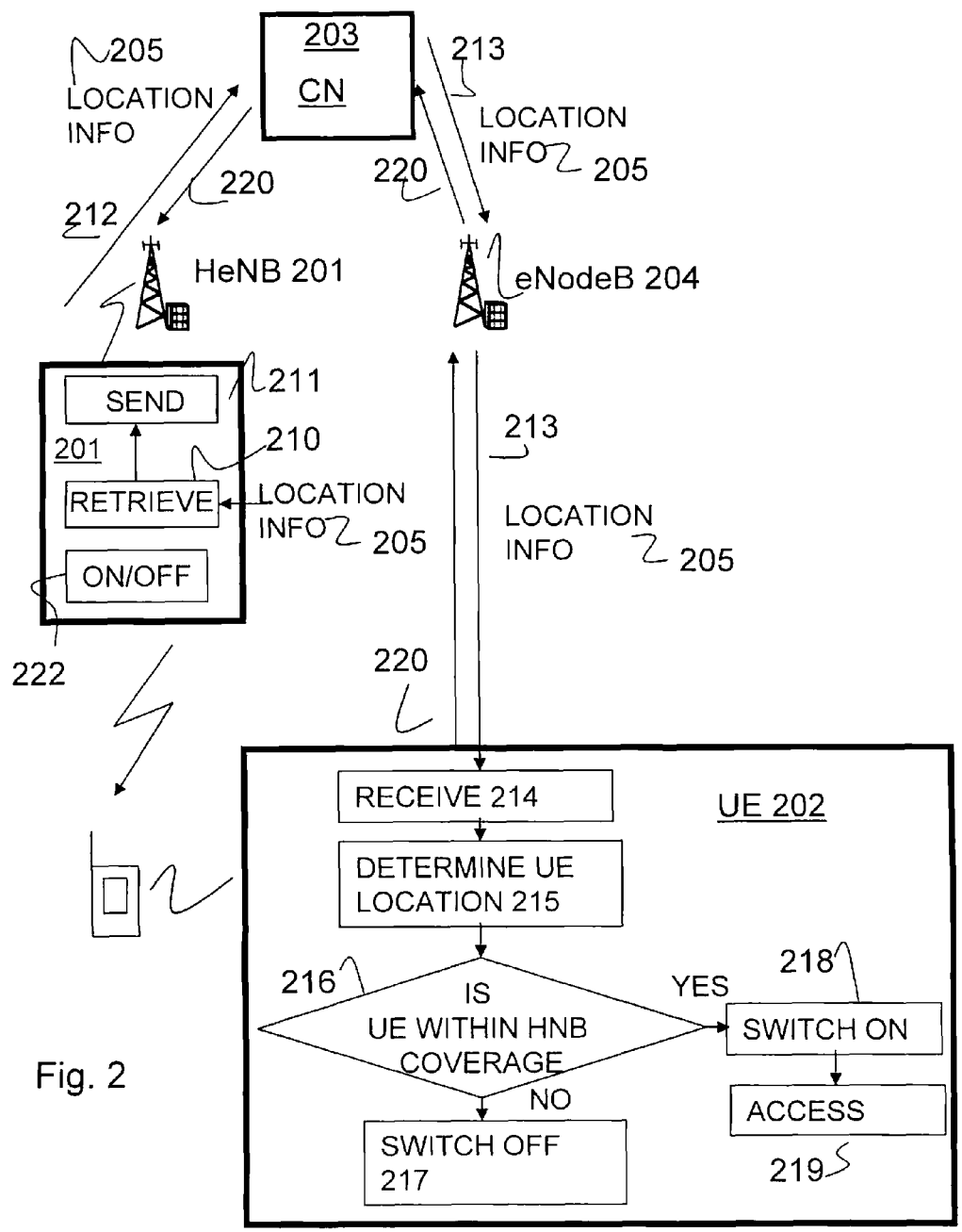
FIG. 2 illustrates a flowchart of the methods of embodiments of the present invention.

Turning now to FIG. 2 showing the embodiments of the present invention. The solution according to the present invention is achieved by configuring the HeNB 201 to retrieve 210 location information 205 indicative of its location and sending 211 this location information 205 via a core network node 203 to a UE 202 authorized to access the HeNB 201. The UE 202 can then based on this received 214 location information and on a determination 215 of the location of the UE determine 216 whether the UE is located in the coverage of the HeNB. This implies that the authorized UEs of the HeNB know when they should try to find and access the HeNB and the UEs may then avoid this searching for HeNB and accessing the HeNB when it is out of the HeNB coverage which will save UE battery and reduce interference.

According to a first embodiment, the HeNB 201 comprises a UE receiver configured to retrieve 210 Femto Cell Location Information 205 indicative of the location of the HeNB 201. According to this embodiment, the information may be retrieved by listening to broadcasted system information comprising the unique cell identities of the surrounding macro network cells (e.g. Cell identity, Tracking Area id and Public Land Mobile Network identity, Physical Cell Identity (also referred to as short cell identity). The UE receiver 210 in the HeNB 201 listens either on the macro network continuously or is triggered to perform the measurements on the location information according to predefined rules. Examples of such rules are that the measurements always are performed at startup, periodically every $2^{nd}$ hour, during the night hours, or a combination thereof.

The femto cell location information comprising information of surrounding cells of the HeNB is transmitted 212 to a core network node 203, e.g. the MME. The MME 203 forwards 213 the femto cell location information 205 to the UE 202 being authorized to access the HeNB 201. Accordingly, the UE 202 receives 214 the femto cell location information 205 and determines any changes of location. In accordance with this embodiment, the UE determines 215 its location by listening to broadcasted system information from the surrounding macro cells. By comparing the macro cells included in the received femto cell location information and the surrounding macro cells of the UE obtained from the system information, the UE 202 determines 216 whether its own location is within a range in relation to the location of the HeNB 201, i.e. if its close enough to the HeNB 201 such that it is likely that the UE 202 is close to or within the coverage of the HeNB 201. If it is determined that the location of the UE 202 is within a range in relation to the location of the HeNB 201, the UE 202 tries to find the HeNB and attempts to access 219 the HeNB 201.

According to a second embodiment, the HeNB 201 comprises a GPS device/receiver that is capable of retrieving location information 210 by detecting the current location by using the geographical coordinates of the HeNB 201, e.g. longitude, latitude and optionally also altitude. Hence, the Femto Cell Location Information comprises in this embodiment the geographical coordinates of the HeNB 201.

The GPS device/receiver of the HeNB 201 determines the geographical coordinates of the HeNB 201 and inserts them into the Femto Cell Location Information. The HeNB 201 sends 212 the femto call location information to a core network node 203, e.g. the MME, and the core network node 203 forwards 213 this information 205 to the UEs 202 that are allowed to access the specific HeNB 201. Furthermore, the UE 201 is adapted to receive 214 the femto cell location information 205 indicative of the location of the HeNB 201. The UE 202 comprises a GPS device/receiver to determine 215 its own location, and means for determining whether its own location is within a range in relation to the location of the HeNB. I.e. the UE comprises means for determining if the geographical coordinates of the UE is in the proximity of the geographical coordinates of the HeNB. If the coordinates of the UE corresponds substantially with the coordinates of the HeNB, it can be concluded that it is likely that the UE is within the coverage of the HeNB and the UE tries to find the HeNB and attempts to access the HeNB.

The detection of the surrounding macro coverage may be a requirement of any HeNB since there is a regulatory requirement to activate transceiver only within an operator domain, i.e. to avoid unlawful transmission in licensed bands. Hence it may be required to find out during HeNB startup if the HeNB is allowed to be used in the current location.

If the HeNB has knowledge of subscriber access on its own it could forward a list of subscribers and the detected femto cell location information to the MME for further distribution to the targeted subscribers/terminals included in the list. The list of subscribers could be identified with e.g. IMSI or MSISDN.

If the HeNB does not have knowledge of the subscriber access it could forward a unique HeNB id (e.g. the "Long Cell Identity" of the HeNB) to the MME together with the detected femto cell location information. The HeNB-id could then be used to reference the allowed access group for a specific HeNB. This means that the MME would use an Access Control Database to find out which UEs are allowed to access this HeNB and then forward the femto cell location information to these UEs.

An advantage with having the HeNB performing the measurement of femto cell location information is that it would allow the HeNB and consequently also the terminals authorized to access the HeNB to always be updated with the HeNB Femto Cell Location Information.

The Femto Cell Location Information according to embodiments of the present invention may be considered as an extension of the HeNB White-list and would preferably be signalled to the dedicated terminals via a core network node such as the MME. Another option is that the MME would trigger the usage of e.g. a special SMS (short message service) message to the authorized UEs, wherein the SMS message comprises parameters such that the HeNB White-list in the UEs can be configured. The Femto Cell Location Information may also be transferred during a pairing procedure.

Another possibility is that the Femto Cell Location Information is used by the UEs in idle mode. In this way the UE may be assisted by the Femto Cell Location Information when to search for e.g. an allowed femto cell on a different carrier.

In accordance with a further embodiment, the received Femto Cell Location Information 205 may be used by the UE 202 to inform the Network (i.e MME via eNB) when to switch HeNB/eNB 201 on 218 and off 217 in order to reduce unnecessary interference caused by an active HeNB or to reduce power consumption. I.e. if the UE 202, based on the Femto Cell Location Information 205, determines 216 that the UE is located within the coverage of a HeNB that the UE is authorized to access, the UE is configured to send 220 a message to that HeNB via the source cell (eNB) 204 and the core network 203 to switch on the targeted HeNB/eNB 201. The UE 202 can then try to find and attempt to access 219 the HeNB 201. In addition, if the UE 202, based on the Femto Cell Location Information 205, determines 216 that the UE 202 is not located within the coverage of a HeNB 201 that the UE 202 is authorized to access, the UE 202 may be configured to send a message to that HeNB 201 via the source eNB 204 and the core network 203 to switch off the targeted HeNB/eNB. In addition, the HeNB/eNB may not be switched off until the core network 203 signals to the HeNB/eNB that no other UEs are close to the HeNB/eNB. Accordingly, the UEs have to signal to the CN (MME) when they are not close to the HeNB/eNB. The core network can then inform the HeNB/eNB to switch off when no UE is close to the HeNB/eNB.

Figure 3:
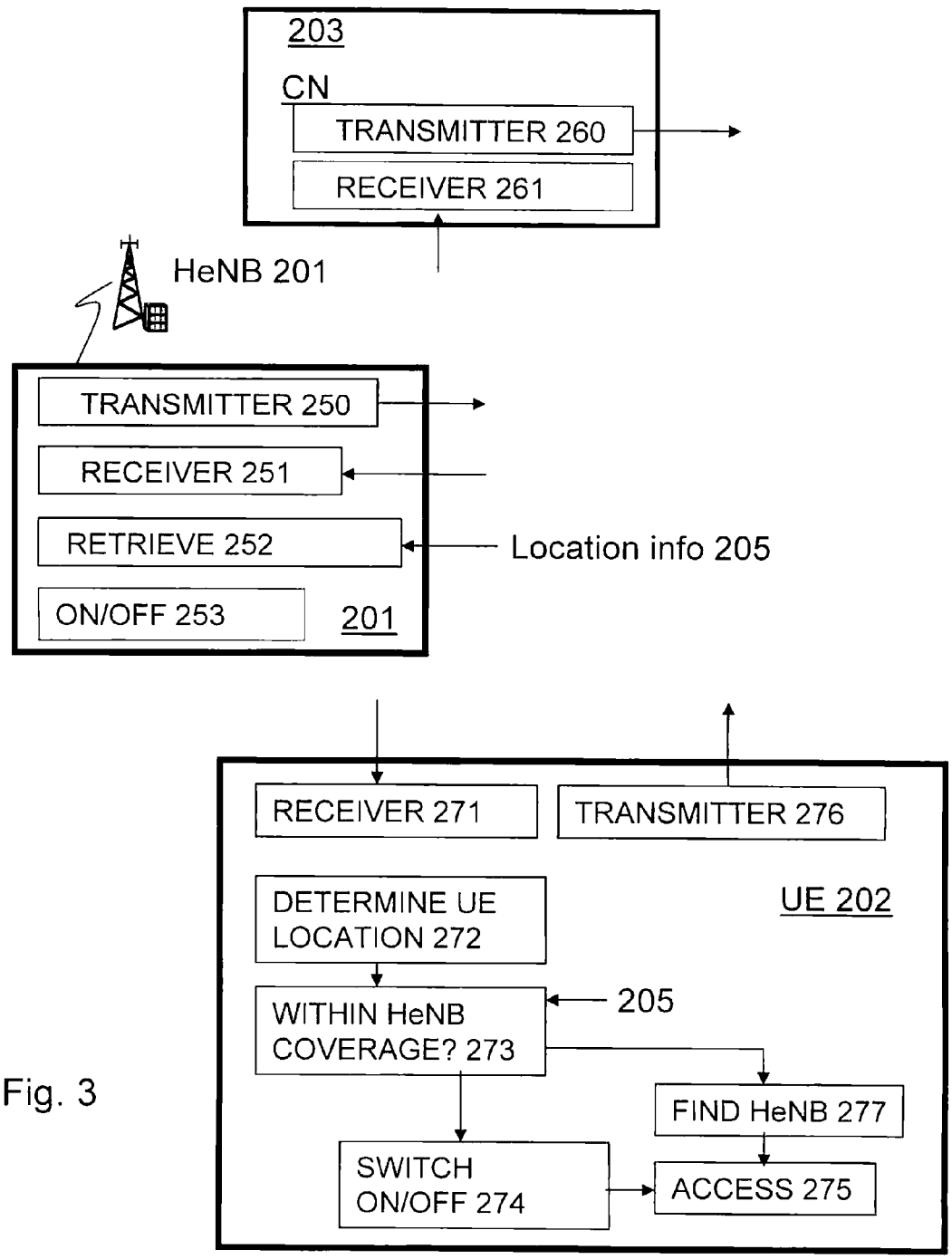
FIG. 3 illustrates schematically arrangements according to embodiments of the present invention.

Turning now to FIG. 3 illustrating a UE 202, a HeNB 201 and a core network node 203 according to embodiments of the present invention. The HeNB 201 is as stated above connectable to the core network node 203 and is adapted to serve at least one femto cell. The HeNB 201 is further connectable to a set of UEs 202 wherein the UEs are authorized to connect to the HeNB. The HeNB 201 comprises means for retrieving 252 Femto Cell Location Information 205 indicative of a location of the HeNB. The means for retrieving may be a UE receiver and/or a GPS device/receiver as explained above. The UE further comprises a transmitter 250 for sending the retrieved femto cell location information 205 to the core network node 203. In this scenario, the Femto cell Location Information comprises information that the UE is either within the coverage area or that the UE is leaving the coverage area. Then CN then needs to inform HeNB/eNB to switch on or off.

In accordance with embodiments of the present invention the HeNB 201 further comprises means for receiving 251 information from the core network that the HeNB should be switched off, and means for switching off 253 the HeNB if no other UE is connected to or close to the HeNB. Hence, the HeNB also comprises means for receiving information from a UE via the CN that the UE is authorized to connect to the HeNB that the HeNB should be switched on, and means for switching on 253 the HeNB if the HeNB currently is switched off.

The UE 202 illustrated in FIG. 3 is being authorized to be connected to the Home eNode B 201. The UE 202 comprises means for receiving 271 Femto Cell Location Information indicative of a location of the HeNB 201 and means for determining 272 its own location. The UE further comprises means for determining 273 whether its own location is within a range in relation to the location of the HeNB 201 based on the received location information 205 and the location of the UE. In addition, means for finding the HeNB and means for performing 275 an access attempt are also provided and an access attempt is performed if it is determined that the location of the UE 202 is within a range in relation to the location of the HeNB 201.

The UE may also comprise a transmitter 276 for sending a message via the core network to the HeNB 201 to switch on the HeNB. The UE may then try to find and access the HeNB if it is determined that the location of the UE is within a range in relation to the location of the HeNB. Correspondingly, the transmitter 276 may also be used for sending via the core network a message to the HeNB 201 to switch off the HeNB 201, if it is determined that the location of the UE 202 is not within a range in relation to the location of the HeNB 201.

Furthermore, the location information may indicate surrounding cells of the HeNB, and the means for determining 273 whether its own location is within a range in relation to the location of the HeNB may comprise means for listening to broadcasted system information to obtain knowledge of surrounding cells, means for comparing the obtained knowledge of surrounding cells with the information of surrounding cells comprised in the received location information, and means for determining that the location of the UE is within a range in relation to the location of the HeNB based on said comparison.

Alternatively, or in combination with the surrounding cells, the location information may indicate geographical coordinates of the HeNB, and the means for determining 273 whether its own location is within a range in relation to the location of the HeNB may comprise the means for 272 using a GPS device/receiver to determine the geographical coordinates of the UE, means for comparing the geographical coordinates of the UE with the geographical coordinates of the HeNB, and means for determining that the location of the UE is within a range in relation to the location of the HeNB based on said comparison.

A core network node 203 connectable to the HeNB 201 and macro radio base stations, serving macro cells, is also shown in FIG. 3. The core network 203 comprises means for receiving 261 Femto Cell Location Information 205 indicative of a location of the HeNB 201 and means for forwarding 260 the received Femto Cell Location Information to the at least one UE 202. The means for receiving 261 may also be used for receiving information from a UE that a HeNB that the UE is authorized to connect to should be switched off or switched on and the means for forwarding 260 may also be used for forwarding 260 the received information, to the HeNB, that the HeNB should be switched off or switched on. It should also be noted that the UEs may inform the core network whether it is within or out of the coverage of a HeNB such that the CN can instruct the HeNB to switch on and off.

While the present invention has been described with respect to particular embodiments including certain device arrangements and certain orders of steps within various methods, those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method for a Home eNode B (HeNB) of a mobile telecommunication network, wherein the HeNB is connectable to a core network node of the mobile telecommunication network and is adapted to serve at least one femto cell and the HeNB is further connectable to a set of user equipment (UE) being authorized to connect to the HeNB, the method comprises the steps of:
    retrieving Femto Cell Location Information indicative of a location of the HeNB;
    sending the retrieved Femto Cell Location Information to the core network node for forwarding the Femto Cell Location Information to a UE authorized to connect to the HeNB, wherein the UE determines whether the UE is within or close to a coverage of the HeNB based on a location of the UE determined by the UE;
    receiving information, from the core network node, that the HeNB should either be switched off or switched on; and
    switching the HeNB off or on, according to the information received from the core network node.

2. The method according to claim 1, wherein the Femto Cell Location Information comprises information of surrounding macro cells to the HeNB.

3. The method according to claim 2, wherein the Femto Cell Location Information is obtained by a UE receiver implemented in the HeNB by listening to system information of adjacent macro cells.

4. The method according to claim 1, wherein the Femto Cell Location Information comprises information of geographic coordinates of the HeNB.

5. The method according to claim 1, wherein the Femto Cell Location Information is obtained by a global positioning system device or receiver.

6. A method for a user equipment (UE) authorized to be connected to a Home eNode B (HeNB) of a mobile telecommunication network, wherein the HeNB serves at least one femto cell, the method comprises the steps of:
    receiving Femto Cell Location Information indicative of a location of the HeNB;
    determining a location of the UE;
    determining whether the location of the UE is within a range in relation to the location of the HeNB;
    performing an access attempt if the location of the UE is within the range in relation to the location of the HeNB;
    sending a message to the HeNB via a currently connected eNode B and a core network node to switch on the HeNB, and then performing an access attempt, if the location of the UE is within the range in relation to the location of the HeNB; and
    sending a message to the HeNB via a currently connected eNode B and a core network node to switch off the HeNB if the location of the UE is not within the range in relation to the location of the HeNB.

7. The method according to claim 6, wherein the Femto Cell Location Information indicates surrounding macro cells to the HeNB, and the step of determining whether the location of the UE is within the range in relation to the location of the HeNB, comprises the further steps of:
    listening to broadcasted system information to obtain knowledge of surrounding macro cells;
    comparing the knowledge of the surrounding macro cells with the Femto Cell Location Information indicating the surrounding macro cells; and determining that the location of the UE is within the range in relation to the location of the HeNB based thereon.

8. The method according to claim 6, wherein the Femto Cell Location Information indicates geographical coordinates of the HeNB, and the step of determining whether the location of the UE is within the range in relation to the location of the HeNB, comprises the further steps of:
using a global positioning system receiver or device to determine the geographical coordinates of the UE;
comparing the geographical coordinates of the UE with the geographical coordinates of the HeNB; and
determining that the location of the UE is within the range in relation to the location of the HeNB based thereon.

9. A method for a core network node connectable to a Home eNode B (HeNB) and to at least one user equipment (UE) via a radio base station, wherein the at least one UE is authorized to access the HeNB, the method comprises the steps of:
receiving Femto Cell Location Information indicative of a location of the HeNB;
forwarding the Femto Cell Location Information to the at least one UE via the radio base station wherein the at least one UE determines whether the UE is within a coverage of the HeNB based on a location of the at least one UE determined by the at least one UE;
receiving information from the at least one UE that a HeNB should be switched off or switched on; and
forwarding the information to the HeNB.

10. The method according to claim 9, wherein the Femto Cell Location Information further comprises identities of the at least one UE having access to the HeNB to be used in the forwarding step.

11. The method according to claim 9, wherein the Femto Cell Location Information further comprises an identity of the HeNB and identities of the at least one UE having access to the HeNB retrievable from a database based on the identity of the HeNB to be used in the forwarding step.

12. A Home eNode B (HeNB) of a mobile telecommunication network, wherein the HeNB is connectable to a core network node of the mobile telecommunication network and is adapted to serve at least one femto cell and the HeNB is further connectable to a set of user equipment (UE) being authorized to connect to the HeNB, the HeNB comprises:
means for retrieving Femto Cell Location Information indicative of a location of the HeNB,
a transmitter for sending the Femto Cell Location Information to the core network node for forwarding the Femto Cell Location Information to a UE authorized to connect to the HeNB, wherein the UE determines whether the UE is within or close to a coverage of the HeNB based on a location of the UE determined by the UE;
means for receiving information from the core network node that the HeNB should either be switched off or switched on; and
means for switching the HeNB off or on, according to the information received from the core network node.

13. The HeNB according to claim 12, wherein the Femto Cell Location Information further comprises information of surrounding macro cells to the HeNB.

14. The HeNB according to claim 13, wherein the means for retrieving the Femto Cell Location Information is a UE receiver implemented in the HeNB adapted to listen to system information of adjacent macro cells.

15. The HeNB according to claim 12, wherein the Femto Cell Location Information further comprises information of geographic coordinates of the HeNB.

16. The HeNB according to claim 15, wherein the means for retrieving the Femto Cell Location Information is a global positioning system device or receiver.

17. A user equipment (UE) authorized to be connected to a Home eNode B (HeNB) of a mobile telecommunication network, wherein the HeNB serves at least one femto cell, the UE comprises:
means for receiving Femto Cell Location Information indicative of a location of the HeNB,
means for determining a location of the UE,
means for determining whether the location of the UE is within a range in relation to the location of the HeNB,
means for performing an access attempt if the location of the UE is within the range in relation to the location of the HeNB;
a transmitter for sending a message to the HeNB via a currently connected eNode B and a core network node to either switch on the HeNB or switch off the HeNB.

18. The UE according to claim 17, wherein the Femto Cell Location Information indicates surrounding macro cells to the HeNB, and the means for determining whether the location of the UE is within the range in relation to the location of the HeNB comprises means for listening to broadcasted system information to obtain knowledge of the surrounding macro cells, means for comparing the obtained knowledge of surrounding macro cells with the Femto Cell Location Information indicating the surrounding macro cells, and means for determining that the location of the UE is within the range in relation to the location of the HeNB based thereon.

19. The UE according to claim 17, wherein the Femto Cell Location Information indicates geographical coordinates of the HeNB, and the means for determining whether the location of the UE is within the range in relation to the location of the HeNB comprises means for using a global position system device to determine the geographical coordinates of the UE, means for comparing the geographical coordinates of the UE with the geographical coordinates of the HeNB, and means for determining that the location of the UE is within the range in relation to the location of the HeNB based thereon.

20. A core network node connectable to a Home eNode B (HeNB) and to a user equipment (UE) via a radio base station, wherein the UE is authorized to access the HeNB, the core network node comprises:
means for receiving Femto Cell Location Information indicative of a location of the HeNB;
means for forwarding the Femto Cell Location Information to the UE via the radio base station wherein the UE determines whether the UE is within the coverage of the HeNB based on a location of the UE determined by the UE;
means for receiving information from a UE that a HeNB that the UE is authorized to connect to should be switched off or switched on; and
means for forwarding the information to the HeNB.

21. The core network node according to claim 20, wherein the Femto Cell Location Information further comprises an identity of the UE having access to the HeNB to be used by the means for forwarding.

22. The core network node according to claim 20, wherein the Femto Cell Location Information comprises the identity of the HeNB and an identity of the UE having access to the HeNB retrievable from a database based on the identity of the HeNB to be used by the means for forwarding.

* * * * *

UNITED STATES PATENT AND TRADEMARK OFFICE
CERTIFICATE OF CORRECTION

PATENT NO.        : 8,509,778 B2                                          Page 1 of 1
APPLICATION NO.   : 12/740089
DATED             : August 13, 2013
INVENTOR(S)       : Buchmayer et al.

It is certified that error appears in the above-identified patent and that said Letters Patent is hereby corrected as shown below:

On the Title Page, in Item (58), under "Field of Classification Search", in Column 2, Line 4, delete "5.1-435.3;".

On the Title Page, under "Primary Examiner", in Column 2, Line 1, delete "Mehendra Patel" and insert -- Mahendra Patel --, therefor.

In the Specifications

In Column 5, Line 10, delete "its" and insert -- it's --, therefor.

In Column 5, Line 30, delete "UE 201" and insert -- UE 202 --, therefor.

Signed and Sealed this
Twenty-fourth Day of December, 2013

Margaret A. Focarino
*Commissioner for Patents of the United States Patent and Trademark Office*